United States Patent
Blackman et al.

[11] Patent Number: 5,909,189
[45] Date of Patent: Jun. 1, 1999

[54] GROUP TRACKING

[75] Inventors: Samuel S. Blackman; Robert J. Dempster, both of Los Angeles; Thomas S. Nichols, La Habra, all of Calif.

[73] Assignee: Raytheon Company, Lexington, Mass.

[21] Appl. No.: 08/748,647

[22] Filed: Nov. 14, 1996

[51] Int. Cl.⁶ .................................................. G01S 13/66
[52] U.S. Cl. .............................. 342/90; 342/96; 342/108; 342/145
[58] Field of Search .................................. 342/94, 95, 96, 342/80, 108, 115, 145, 195; 244/3.11, 3.14, 3.15

[56] References Cited

U.S. PATENT DOCUMENTS

| | | | |
|---|---|---|---|
| 4,720,711 | 1/1988 | Quesinberry et al. | 342/96 |
| 4,768,034 | 8/1988 | Preikschat et al. | 342/80 |
| 5,202,691 | 4/1993 | Hicks | 342/90 |
| 5,208,591 | 5/1993 | Ybarra et al. | 340/961 |
| 5,321,406 | 6/1994 | Bishop et al. | 342/32 |
| 5,365,236 | 11/1994 | Faragasan et al. | 342/53 |
| 5,379,044 | 1/1995 | Carlson et al. | 342/90 |
| 5,414,643 | 5/1995 | Blackman et al. | 342/95 |
| 5,537,118 | 7/1996 | Appriou | 342/95 |
| 5,554,990 | 9/1996 | McKinney | 342/36 |
| 5,631,653 | 5/1997 | Reedy | 342/62 |
| 5,638,281 | 6/1997 | Wang | 364/461 |

OTHER PUBLICATIONS

*Multiple–Target Tracking with Radar Applications*, Samuel S. Blackman, Artech House, Inc., 1986, at pp. 9–11, 25–28, 258–259, 397–400.

*Primary Examiner*—Charles T. Jordan
*Assistant Examiner*—Christopher K. Montgomery
*Attorney, Agent, or Firm*—Christopher S. Daly; Nutter, McClennen & Fish, LLP

[57] ABSTRACT

A method for automatic group tracking detects target formations and group tracks corresponding to each formation. Pseudo-observations are formed to represent missing observations in each track group. The pseudo-observations update the track states of undetected targets. Track validity estimates eliminate false tracks resulting from series of pseudo-observations. A group average velocity applied to each track in the group helps to maintain velocity stability. The operator has the option of suppressing the display of all tracks except for the leader of each group to eliminate the distraction of intra-group switching. This method can be applied to trackers that maintain a single track for each target or to trackers that maintain multiple track branches on each target, such as MHT.

18 Claims, 3 Drawing Sheets

GROUP TRACKING

TECHNICAL FIELD OF THE INVENTION

This invention relates to the tracking of aircraft targets flying in groups or formations.

BACKGROUND OF THE INVENTION

When aircraft fly close together in formation, radars cannot always resolve them. This results in fewer reported observations than aircraft. Previous approaches do not include methods for determining when aircraft are flying in groups, calculating a group average velocity, forming pseudo observations, applying group tracking in the context of a multiple hypothesis tracker.

It would therefore be advantageous to provide a group tracking method with the capability of determining when aircraft are flying in groups.

Other desirable capabilities include the calculation of a group average velocity, the formation of pseudo observations, and the application of group tracking in the context of a multiple hypothesis tracker.

It would be further advantageous to provide a method of group tracking which improves track velocity stability and track continuity, or which provides the option of displaying the individual tracks in a group or a single track representing the whole group.

SUMMARY OF THE INVENTION

A method is described for tracking targets traveling in groups, comprising a sequence of the following steps:

receiving observations of the targets being tracked over time;

associating current observations with corresponding target tracks each having a track state, a track state including position and velocity estimates for the corresponding target;

assigning tracks in close proximity and with similar velocities to a track group;

calculating an average velocity for the track group;

applying the calculated average velocity to each track in the group by changing the velocity associated with each track in the group to the group velocity to provide track velocity stability.

The method can further include the steps of displaying track attributes on a display, the track attributes to be displayed determined by operator selection, wherein depending on the operator selection, in a first display mode only attributes for a group track leader are displayed, and in a second display mode attributes for all tracks in the group are displayed.

According to a further aspect of the invention, the method includes processing the observations to identify missing observations for a track within a group, generating a pseudo-observation to substitute for the missing observation, and associating the pseudo-observation with a corresponding track. A track validity value affected by the number of pseudo-observations assigned to a track is calculated, and the track is deleted if the validity value falls below a predetermined threshold value.

According to another aspect of the invention, a tracking system for tracking groups of targets flying in formation is described, and includes a sensor system for generating observations of the targets being tracked over time, a tracker responsive to the observations for processing the observations to form target tracks and to generate track display signals, and a display device for displaying attributes of the tracks. The tracker includes means for associating current observations with corresponding target tracks each having a track state, a track state including position and velocity estimates for the corresponding target, means for assigning tracks in close proximity and with similar velocities to a track group, means for calculating an average velocity for the track group, and means for applying the calculated average velocity to each track in the group by changing the velocity associated with each track in the group to the group velocity to provide track velocity stability.

The tracker further comprises means for processing the observations to identify missing observations for a track within a group, means for generating a pseudo-observation to substitute for said missing observation, and means for associating the pseudo-observation with a corresponding track.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Figure 1:
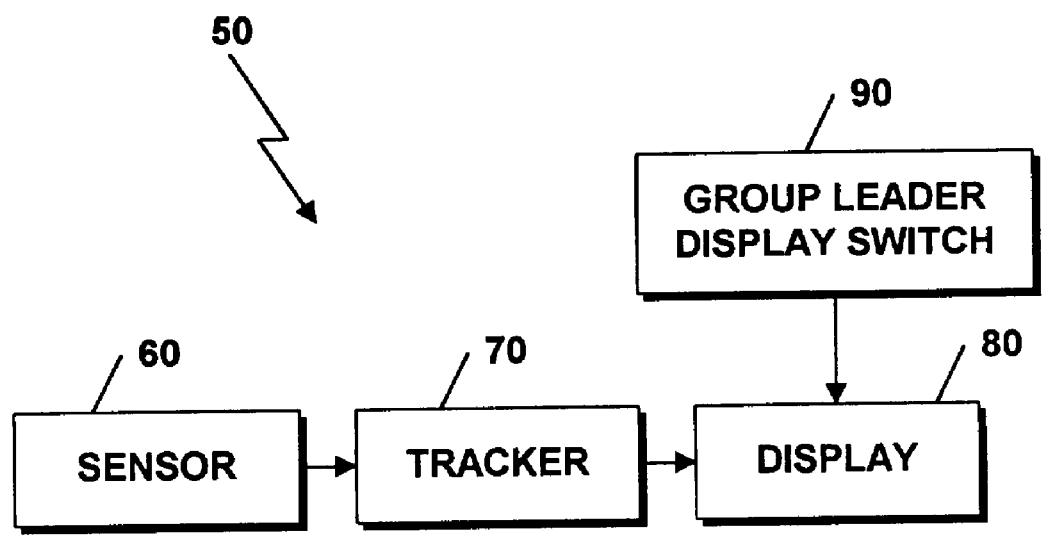
FIG. 1 is a block diagram of a tracking system in accordance with the invention.

The purpose of a target tracker is to process sensor observations to form estimates of target states that are displayed for use by an operator. As used herein, the term "target" is any moving object such as an aircraft, missile or other object of interest. The term "sensor" refers to a radar or any other device capable of detecting and measuring the position of a target. The sensor provides observations consisting of measured target position and other measured target attributes to the tracker. The sensor may provide the tracker with a series of observations from each of several targets over a period of time, but it cannot necessarily identify the observations in a series as corresponding to the same target. The sensor may also provide observations of clutter objects, i.e. objects that are not of interest, such as birds, mountains, and automobiles.

The tracker forms a track on each target by associating the target's sensor observations together. A sequence of observations 10A–10D are associated by a tracker to form a track. A sequence of observations are associated by a tracker to form a track. The first observation in the sequence of observations represents the oldest observation and the last observation in the sequence of observations represents the current observation. discriminates between targets and clutter. It then filters the position measurements of the track's observations (and perhaps other measured target attributes) to estimate the state of each target. The target state consists of the target position and velocity estimates and may also contain other information such as the target's estimated acceleration. The tracker generally performs both association and filtering at frequent intervals; i.e. the tracker associates newly received observations with existing tracks and updates the state estimate of each track with the position measurements of the newly associated observations.

The position, velocity and other attributes of a target track are usually displayed to an operator who may use the information for a variety of purposes. For example, an air traffic controller would use the information to ensure safe separation between aircraft, while an air defense operator might use the information to assign interceptors or missiles to targets.

To meet processing and memory limitations, trackers have traditionally decided with which single track a given observation should be associated very quickly upon reception of the observation. This approach leads to association errors in several ambiguous cases, e.g. targets in close proximity, maneuvering targets, and clutter observations near a true target.

To avoid these association errors, multiple hypothesis tracking (MHT) tentatively associates each observation with tracks of all targets that reasonably could have generated it. Each existing track branches into a number of tracks representing alternative observation-to-track associations. (Hypotheses representing combinations of tracks are also constructed in the association process). The collection of tracks branching from a single track is referred to as a family. Until ambiguities are resolved, each track can branch again as new radar observations are received. Consequently, the number of tracks can grow very quickly.

To manage this potential combinatorial explosion of tracks, unlikely tracks are continually pruned using a variety of methods. The result of this pruning process is the eventual elimination of most association ambiguities, leaving a small set of likely tracks. In many cases, the set of tracks representing a single track never collapses to a single track. In such cases, the most likely track is selected for display. Maintaining multiple hypothetical tracks for a single target allows MHT to base association decisions on more information than traditional tracking methods use, resulting in more correct decisions. While both MHT and traditional trackers select and display a single track representing a target, MHT is able to correct an erroneous selection in the light of new data while traditional trackers do not retain the information necessary to do this.

The smaller the separation between two or more targets, the more difficult it becomes for a sensor to resolve them. When targets are not resolved, the sensor detects fewer targets than are actually present and, consequently, does not report observations on all of the targets. One situation in which small separations can occur is when targets move together in formation. In this case, two or more targets stay close together with similar velocities over a period of time, keeping the same relative positions with respect to each other. Because observations are not received for all targets in the formation, some of the tracks representing the targets are not associated with observations. Because the tracks in the group are close together, it may be unclear which track corresponds to each observation, and observations can be misassociated. This can lead to several problems, e.g., tracks jump from one target to another, the track velocities become unstable, and tracks can fail to follow the targets when they turn as a group.

In accordance with the invention, a method for automatic group tracking detects target formations and group tracks corresponding to each formation. In accordance with the method, pseudo-observations are formed to represent missing observations in each track group. The pseudo-observations update the track states of undetected targets. Track validity estimates eliminate false tracks resulting from series of pseudo-observations. A group average velocity applied to each track in the group helps to maintain velocity stability. The operator has the option of suppressing the display of all tracks except for the leader of each group to eliminate the distraction of intra-group switching.

This method can be applied to trackers that maintain a single track for each target or to multiple-branch trackers (those that maintain multiple track branches on each target), such as MHT.

FIG. 1 is a block diagram of a tracking system 50 embodying the invention. One or more sensors 60 provide observations consisting of measured target position and other measured target attributes to the tracker 70. The tracker forms a track on each target by associating the target's sensor observations together. The tracker also groups some of the tracks together and operates on the track groups to improve the track state estimates. The position, velocity and other attributes of a target track are displayed on display 80 to an operator, who can select one of two display methods for track groups using a group leader display switch 90 on a display console.

Figure 2:
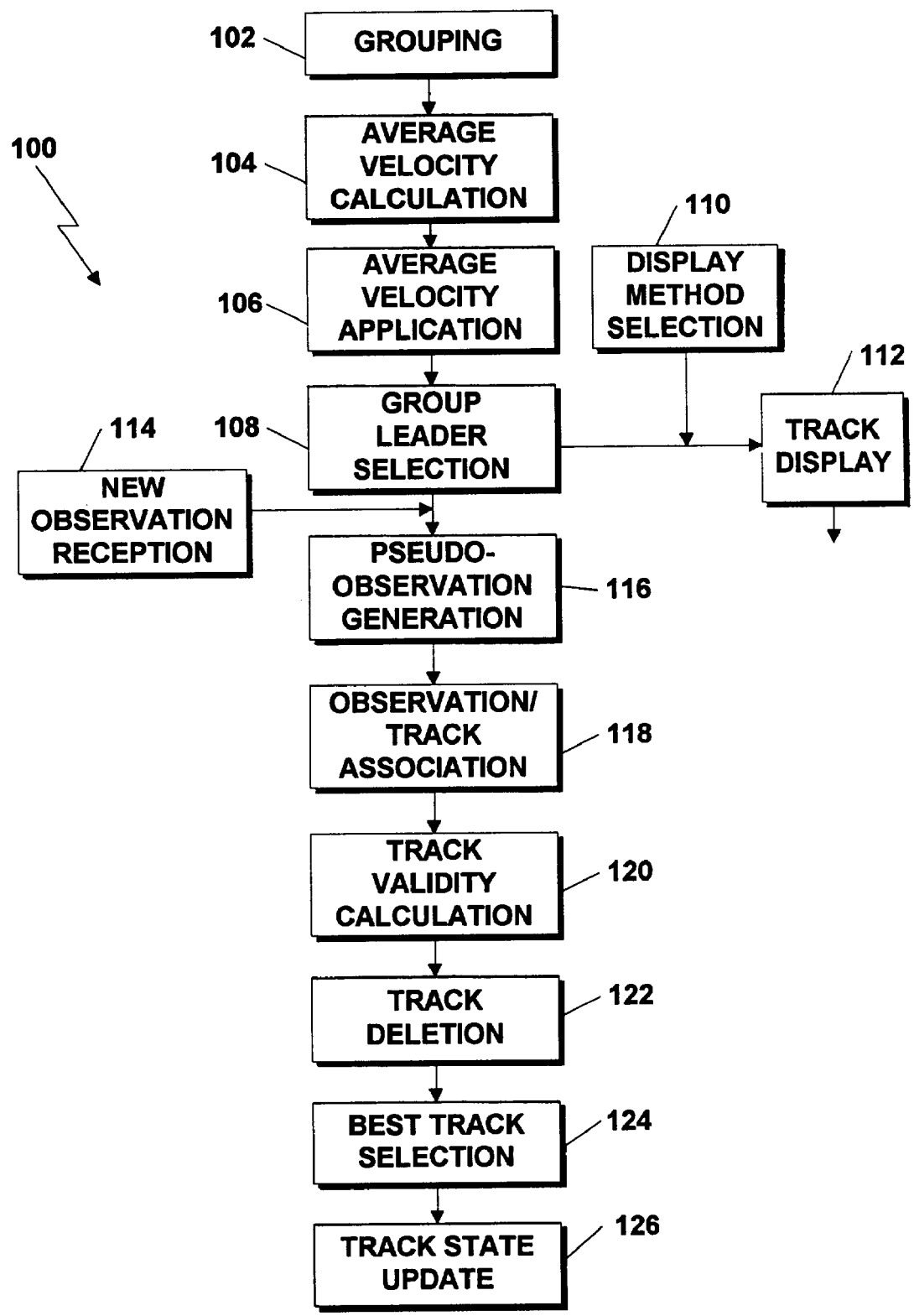
FIG. 2 is a simplified flow diagram illustrating the process flow of a method embodying this invention.

FIG. 2 is a simplified flow diagram illustrating a group tracking method 100 performed by the tracker 70 in accordance with the invention. Target tracking is a cyclical process, and the selection of a starting point is somewhat arbitrary. For the purpose of this discussion, the formation and dissolution of track groups is chosen as an exemplary starting point. Single target tracking and group tracking are performed together in the same system and share many of the same methods. Methods for single target tracking and methods that are common to single target tracking and group tracking are known in the art, and not described in detail herein except where needed to clarify the group tracking process.

The first step in the group tracking process 100 is a grouping step 102. In this step, tracks or targets close enough together that a sensor may not always resolve them and moving with similar velocities are assigned to the same group. A track is removed from any group which contains no other track with a similar position and velocity.

At step 104, average velocity calculations are performed. For each group, the group average speed and heading is determined over all tracks in the group. The average may alternatively be taken over a subset of the tracks in the group, such as tracks that were filtered with an observation from the most recent batch of observations, or tracks that were not updated with pseudo-observations, or tracks which satisfy both of these conditions.

At the average velocity application step 106, for each group, the speed and heading of each track in the group is changed to the group average speed and heading. Alternatively, for multiple-branch trackers, the average velocity may be applied only to the best track in each family, or to all tracks in the family.

At group leader selection step 108, one track (or one family for multiple-branch trackers) in each group is selected to be the group leader based on a set of rules. One example of a set of rules for choosing the group leader is the following. First, preference is given to tracks (or families) on targets that report their identities by "identification friend or foe" (IFF) transponder or other means. If there is more than one such track (or family) in the group, then preference is given to tracks (or families) that were previously group leaders. If more than one track in the group was previously a group leader, then the one that led the largest group is selected. If there is a tie for size of the group previously led, then the tie is broken arbitrarily. Second, if there is no track (or family) in the group on a target that reports its identity, then preference is given to tracks (or families) that were previously group leaders. If more than one track in the group was previously a group leader, then the one that led the largest group is selected. If there is a tie for size of the group previously led, then the tie is broken arbitrarily. Once a track (or family) is selected as the group leader, it remains the leader until it leaves the group or the group merges with another group.

At display method selection step 110, the operator opts either to display all target tracks, or to display group leader tracks only, by operating switch 90 on the console of display 80.

At track display step 112, track attributes are displayed to the operator in graphical form, or by other means. If the operator has selected display of group leader tracks only, then only the group leader track (or the best track in each group leader family) is displayed for each track group. Otherwise, each track (or the best track in each family) is displayed. As part of this second option, tracks that are in groups, but not group leaders, may be identified on the display with a special symbol or color. The operator-selected display method does not affect the display of single targets (those not in groups). The displayed tracks may be extrapolated using the estimated track velocities and other track attributes until new track state estimates are generated.

The best track is selected in the following manner. One track at most is selected from each family to form a hypothesis, with the condition that the selected tracks cannot share observations or pseudo-observations anywhere in their histories. Different hypotheses are formed using different tracks. The score of each hypothesis is formed by summing the score of each track forming the hypothesis; the score of each track is determined using known techniques. See, e.g., *Multiple-Target Tracking with Radar Applications,* Samuel S. Blackman, Artech House, Inc., 1986, at pages 258–259. The hypothesis with the highest score is declared to be the best hypothesis. For each family, the "best" track is that track appearing in the best hypothesis.

Step 114 signifies new observation reception, wherein the tracking process waits for new observations. The process continues when new observations are received.

Figure 3:
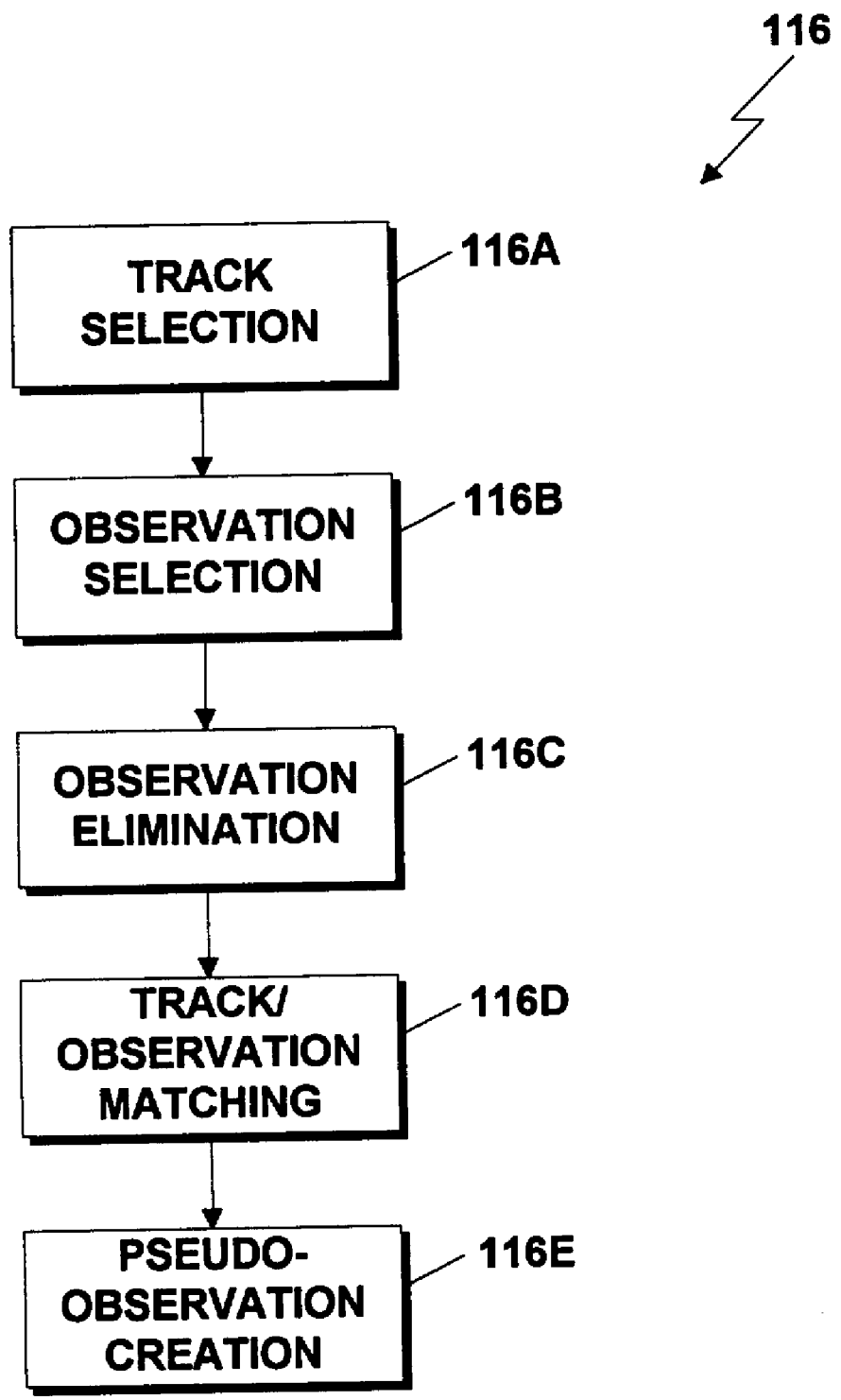
FIG. 3 is a flow diagram illustrating in further detail the process flow of the pseudo-observation generation of the method of FIG. 2.

Pseudo-observation generation occurs at process block 116, more fully illustrated in FIG. 3. Several steps are performed during pseudo-observation generation. The first is track selection 116A, wherein the set of tracks A is selected that have not been updated by more than a given maximum number of consecutive pseudo-observations. (For multiple-branch trackers, each family is selected for which the best track has not been updated by more than a given maximum number of consecutive pseudo-observations.) Next, at observation selection step 116B, the set B is selected of observations that are within a distance less than x from any track (or family) in set A. (The distance can be calculated as a Euclidian distance, a statistical distance, or any other useful definition of distance.) At the observation elimination step 116C, each observation with a distance less than y (where y is less than x, and the same generalizations apply to distance) from only one track (or family) in set A is eliminated. The corresponding track is also eliminated from set A.

Steps 116A–116C can be illustrated by way of example in which it is assumed that three tracks T1, T2, T3 are all in a first set A. Assume observation O1 is within a distance x of tracks T1, T2. Because observation O1 is within the distance x of tracks T1, T2, observation O1 is placed in a set B. Assume an observation O1 is not within the distance x of tracks T1, T2. Because observation O1 is not within the distance x of tracks T1, T2, observation O1 is not placed in set B. Observation O1 is also within distance y of track T1, but is not within y of any other track. Consequently, track T1 is removed from set A and observation O1 is removed from set B.

At track/observation matching step 116D, an optimal assignment algorithm is used to pair as many of the tracks (or families) in set A with observations in set B as possible while minimizing the sum of the squared distances associated with each observation/track pair. Such assignment algorithms are known in the art, such as for example, *Multiple-Target Tracking with Radar Applications,* Samuel S. Blackman, Artech House, Inc., 1986, at pages 397–400.

At step 116E, pseudo-observation creation, the closest observation is found for each track (or family) in set A that is not paired with an observation in step 116D. If a pseudo-observation has not already been created for this observation, a pseudo-observation is created with the same position measurement as the observation. A link is created between the pseudo-observation and the track (or, for multiple branch-trackers, between the pseudo-observation and each track in the family) with a distance of less than z from the observation. This step is demonstrated by the example, wherein one track branch from family A and one track branch from family B are within a distance z of the pseudo-observation. Each of these two tracks is linked with the pseudo-observation.

At observation track association step 118, observations and pseudo-observations are associated with tracks, using a method known in the art. An association method suitable for the purpose is described in *Multiple-Target Tracking with Radar Applications,* Samuel S. Blackman, id., at pages 9–10 and 397–400. Pseudo-observations are treated in the same way as real observations for this purpose, with two exceptions. First, pseudo-observations can only be associated with tracks to which they are linked. Second, potential associations between tracks and pseudo-observations may be penalized relative to the associations with real observations so that associations between a track's real observations are more likely to be selected. In an MHT tracker, for example, the track score increment resulting from the association of the plot and the track is calculated according to a modification of a method described in *Multiple-Target Tracking with Radar Applications,* Samuel S. Blackman, id., at pages 258–259. In the modified method, an increment is added to the covariance matrix of the plot-track deviation and the probability of detection is reduced. In the observation track association, step 118, new tracks are also initiated, using suitable methods known in the art; see, e.g. *Multiple-Target Tracking with Radar Applications,* Samuel S. Blackman, at pages 10–11.

At track validity calculation step 120, an estimate of the track validity is maintained in the following manner. An initial track validity value for each track is set, updated with a pseudo-observation. The track validity is increased each time the track is associated with a real observation. The track validity is decreased each time the track is associated with a pseudo-observation or is not associated with an observation at a time when a sensor is expected to detect the corresponding target.

At step 122, a track is deleted when its validity value falls below a given threshold.

At step 124, the best track is selected in each family, and this track is used in grouping (step 102) and average velocity calculation (step 104). This step is necessary only for multiple-branch trackers.

At step 126, using methods known in the art, the position and velocity (the state) of each track is updated with the measured target position of the observation. See, e.g., *Multiple-Target Tracking with Radar Applications,* Samuel S. Blackman, id., at pages 25–28. The process then branches to step 102 to cycle through the process.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for tracking targets traveling in groups, comprising a sequence of the following steps:

receiving observations of the targets being tracked over time;

associating current observations with corresponding target tracks each having a track state, a track state including position and velocity estimates for the corresponding target;

assigning tracks in close proximity and with similar velocities to a track group;

selecting a group track leader;

selecting a first display mode or a second display mode; and displaying track attributes on a display, said track attributes to be displayed determined by operator selection, wherein depending on said operator selection, in said first display mode only attributes for said group track leader are displayed, and in said second display mode attributes for all tracks in said group are displayed.

2. The method of claim 1 further comprising the steps of processing said observations to identify missing observations for a track within a group, generating a pseudo-observation to substitute for said missing observation, and associating said pseudo-observation with a corresponding track.

3. The method of claim 2 further comprising the steps of calculating a track validity value affected by the number of pseudo-observations assigned to a track, and deleting said track if said validity value falls below a predetermined threshold value.

4. A method for tracking targets traveling in groups, comprising a sequence of the following steps:

receiving observations of the targets being tracked over time;

associating current observations with corresponding target tracks each having a track state, a track state including position and velocity estimates for the corresponding target;

assigning tracks in close proximity and with similar velocities to a track group;

calculating an average velocity for the track group; and applying the calculated average velocity to each track in the group by changing the velocity associated with each track in the group to the group velocity to provide track velocity stability.

5. The method of claim 4 further comprising the step of selecting a group track leader.

6. The method of claim 5 further comprising the steps of displaying track attributes on a display, said track attributes to be displayed determined by operator selection, wherein depending on said operator selection, in a first display mode only attributes for said group track leader are displayed, and in a second display mode attributes for all tracks in said group are displayed.

7. The method of claim 4 further comprising the steps of processing said observations to identify missing observations for a track within a group, generating a pseudo-observation to substitute for said missing observation, and associating said pseudo-observation with a corresponding track.

8. The method of claim 7 further comprising the steps of calculating a track validity value affected by the number of pseudo-observations assigned to a track, and deleting said track if said validity value falls below a predetermined threshold value.

9. A method for tracking targets traveling in groups, comprising a sequence of the following steps:

receiving actual observations of the targets being tracked over time;

associating current observations with corresponding target tracks each having a track state, a track state including position and velocity estimates for the corresponding target;

processing said observations to identify missing expected observations for a track within a group, generating a pseudo-observation to substitute for said missing observation, and associating said pseudo-observation with a corresponding track;

assigning tracks in close proximity and with similar velocities to a track group;

calculating an average velocity for the track group;

applying the calculated average velocity to each track in the group by changing the velocity associated with each track in the group to the group velocity to provide track velocity stability.

10. The method of claim 9 further comprising the step of selecting a group track leader.

11. The method of claim 10 further comprising the steps of displaying track attributes on a display, said track attributes to be displayed determined by operator selection, wherein depending on said operator selection, in a first display mode only attributes for said group track leader are displayed, and in a second display mode attributes for all tracks in said group are displayed.

12. The method of claim 9 further comprising the steps of calculating a track validity value affected by a number of pseudo-observations associated with a track, and deleting said track if said validity value falls below a predetermined threshold value.

13. A tracking system for tracking groups of targets flying in formation, comprising:

a sensor system for generating observations of the targets being tracked over time;

a tracker responsive to said observations for processing said observations to form target tracks and for generating track display signals;

a display device for displaying attributes of said tracks; and wherein said tracker comprises:

means for associating current observations with corresponding target tracks each having a track state, a track state including position and velocity estimates for the corresponding target;

means for assigning tracks in close proximity and with similar velocities to a track group;

means for calculating an average velocity for the track group; and means for applying the calculated average velocity to each track in the group by changing the velocity associated with each track in the group to the group velocity to provide track velocity stability.

14. The system of claim 13 wherein said tracker further comprises means for selecting a group track leader.

15. The system of claim 13 further comprises operator selectable means for selecting a display mode, wherein said track attributes to be displayed are determined by operator selection, wherein in a first display mode only attributes for said group track leader are displayed, and in a second display mode attributes for all tracks in said group are displayed.

16. The system of claim 13 wherein the tracker further comprises means for processing said observations to identify missing observations for a track within a group, means for generating a pseudo-observation to substitute for said missing observation, and means for associating said pseudo-observation with a corresponding track.

17. The system of claim 16 wherein said tracker further comprises means for calculating a track validity value affected by the number of pseudo-observations assigned to a track, and means for deleting said track if said validity value falls below a predetermined threshold value.

18. The system of claim 13 wherein said tracker comprises a multiple-branch tracker for maintaining multiple track branches on each target.

* * * * *

UNITED STATES PATENT AND TRADEMARK OFFICE
CERTIFICATE OF CORRECTION

PATENT NO. : 5,909,189
DATED : June 1, 1999
INVENTOR(S) : Blackman et al.

It is certified that error appears in the above-identified patent and that said Letters Patent is hereby corrected as shown below:

Col. 2, line 52, delete "10a-10d".
Col. 2, lines 52-54, delete the whole sentence.
Col. 2, lines 57-58, delete "discriminates between targets and clutter.

Signed and Sealed this

Twenty-ninth Day of May, 2001

Attest:

NICHOLAS P. GODICI

*Attesting Officer*  *Acting Director of the United States Patent and Trademark Office*